US008635384B2

(12) United States Patent
Wang et al.

(10) Patent No.: US 8,635,384 B2
(45) Date of Patent: *Jan. 21, 2014

(54) MANAGING DATA MOVEMENT IN A CELL BROADBAND ENGINE PROCESSOR

(75) Inventors: Zheng Wang, Cambridge (GB); Liang Chen, Shanghai (CN); Wenjun Wang, Beijing (CN); Feng Kuan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,014

(22) Filed: Jul. 24, 2012

(65) Prior Publication Data

US 2012/0297092 A1 Nov. 22, 2012

Related U.S. Application Data

(63) Continuation of application No. 12/238,073, filed on Sep. 25, 2008, now Pat. No. 8,255,592.

(30) Foreign Application Priority Data

Sep. 28, 2007 (CN) .......................... 2007 1 0153176

(51) Int. Cl.
*G06F 13/28* (2006.01)
*G06F 12/00* (2006.01)

(52) U.S. Cl.
USPC ........................................... 710/22; 711/172

(58) Field of Classification Search
USPC ........................................................ 710/22
See application file for complete search history.

(56) References Cited

U.S. PATENT DOCUMENTS

| 7,076,609 | B2 | 7/2006 | Garg et al. |
| 2005/0268048 | A1 | 12/2005 | Hofstee et al. |
| 2006/0095718 | A1 | 5/2006 | Day et al. |
| 2007/0041403 | A1* | 2/2007 | Day et al. ...................... 370/469 |
| 2007/0074221 | A1* | 3/2007 | Stenson et al. ................. 718/106 |
| 2007/0083755 | A1* | 4/2007 | Iwamoto ....................... 713/164 |
| 2007/0143551 | A1* | 6/2007 | Marr et al. .................... 711/154 |
| 2008/0201561 | A1* | 8/2008 | Bates et al. ................... 712/228 |

OTHER PUBLICATIONS

"U.S. Appl. No. 12/238,073 Office Action", Sep. 14, 2011, 13 pages.

* cited by examiner

*Primary Examiner* — Titus Wong
(74) *Attorney, Agent, or Firm* — DeLizio Gilliam, PLLC

(57) ABSTRACT

A cell broadband engine processor includes memory, a power processing element (PPE) coupled with the memory, and a plurality of synergistic processing elements. The PPE creates a SPE as a computing SPE for an application. The PPE determines idles ones of the plurality of SPEs, and creates a managing SPE from one of the idle SPEs. Each of the plurality of SPEs is associated with a local storage. The managing SPE informs the computing SPE of a starting effective address of the local storage of the managing SPE and an effective address for a command queue. The managing SPE manages movement of data associated with computing of the computing SPE based on one or more commands associated with the application. A computing SPE sends the one or more commands to the managing SPE for insertion into the command queue.

15 Claims, 3 Drawing Sheets

MANAGING DATA MOVEMENT IN A CELL BROADBAND ENGINE PROCESSOR

RELATED APPLICATIONS

This application claims the benefit under 35 U.S.C. §120 of U.S. patent application Ser. No. 12/238,073 filed Sep. 25, 2008 which claims the benefit of priority under 35 U.S.C. §119 of Chinese Patent Application No. 200710153176.0, entitled "Method of Managing Data Movement and Cell Broadband Engine Processor Using the Same," which was filed on Sep. 28, 2007. The Chinese Patent Application is incorporated herein by reference in its entirety.

BACKGROUND

The present inventive subject matter relates to a cell broadband engine processor, and particularly to a managing data movement in the cell broadband engine processor.

A cell broadband engine (CellBE for short hereinafter) processor is a kind of microprocessor utilizing parallel processing. Generally, basic configuration of a CellBE processor comprises a Power Processing Element (PPE), eight Synergistic Processing Elements (SPEs), a Memory Flow Control (MFC), an Internal Interrupt Control (IIC), and a Main Memory. Computing components of the CellBE processor are PPE and SPEs. Component parts of the CellBE processor are connected via a high-speed bus ("Elements Interconnect Bus" (EIB)). Any two of the eight SPEs may exchange data through a high-speed bus of 25.6 GB therebetween, while only a bus of 25.6 GB totally is between SPEs and the main memory. Bus transfers between SPEs and bus transfers between respective SPEs and the main memory may be in parallel. The CellBE processor is applicable to various applications from handhold devices to main computers.

The CellBE processor presents a change in computer architecture by eight SPEs which may process in parallel, thereby improving computer performance greatly. In order to solve memory wall problems in the CellBE processor, each of SPEs in the Cell BE processor is provided with a specific local storage and may only access its local storage (LS) directly. Introduction of LS can reduce the memory latency. Usually, the size of LS is 256 KB. This size of storage space brings trouble for developers due to its limitation for a programs' binary size.

An existing CellBE processor incorporates a specific physical cache for a SPE. Although the computing performance is improved, the architecture of the CellBE processor is more complex. This results in an increase of cost. Another approach is soft-cache. This approach uses part of LS as a soft-cache. But using soft-cache decreases available space of the LS. Once the size of a program is becomes relatively large, the soft-cache will not be usable.

Due to the limited size of LS, most persistent data must be put into main memory managed by PPE. Processing in PPE is probably switched out by OS, thus increasing communication overhead between PPE and SPE. In addition, data in the main memory may be swapped out into hard disk swap partitions, which increases latency. Also, irregular data movement can cause a cache inconsistency problem, such as cache false sharing.

SUMMARY

Embodiments of the inventive subject matter include a method of managing data movement in a cell broadband engine processor. The method comprises determining one or more idle synergistic processing elements (SPEs) among multiple SPEs in the cell broadband engine processor. A power processing element creates a computing SPE for an application. The power processing element creates a managing SPE from a first SPE of the one or more idle SPEs. The PPE informs the computing SPE of a starting effective address of a local storage (LS) of said managing SPE and an effective address for a command queue. The managing SPE manages movement of data associated with computing of said computing SPE based on one or more commands in the command queue sent from the computing SPE to the managing SPE.

Embodiments of the inventive subject matter include a cell broadband engine processor comprising a memory, a power processing element (PPE) coupled with the memory. The PPE is operable to create a synergistic processing element (SPE) of a plurality of SPEs as a computing SPE for an application, determine idles ones of the plurality of SPEs, create a managing SPE from an idle one of the plurality of SPEs, and inform the computing SPE of a starting effective address of the local storage of the managing SPE and an effective address for a command queue. Each of the plurality of SPEs is associated with a local storage. When a SPE is created as the managing SPE, the SPE is operable to manage movement of data associated with computing of the computing SPE based on one or more commands associated with the application from the computing SPE. When a SPE is created as the computing SPE, the SPE is operable to send the one or more commands to the managing SPE for insertion into the command queue.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

One aspect of the inventive subject matter is to provide a method of managing data movement in a cell broadband engine processor, comprising: determining one or more idle synergistic processing elements (SPEs) among multiple SPEs in the cell broadband engine processor as a managing SPE, and informing a computing SPE among said multiple SPEs of a starting effective address of a LS of said managing SPE and an effective address for a command queue; and said managing SPE managing movement of data associated with computing of said computing SPE based on the command queue from the computing SPE.

Figure 1:
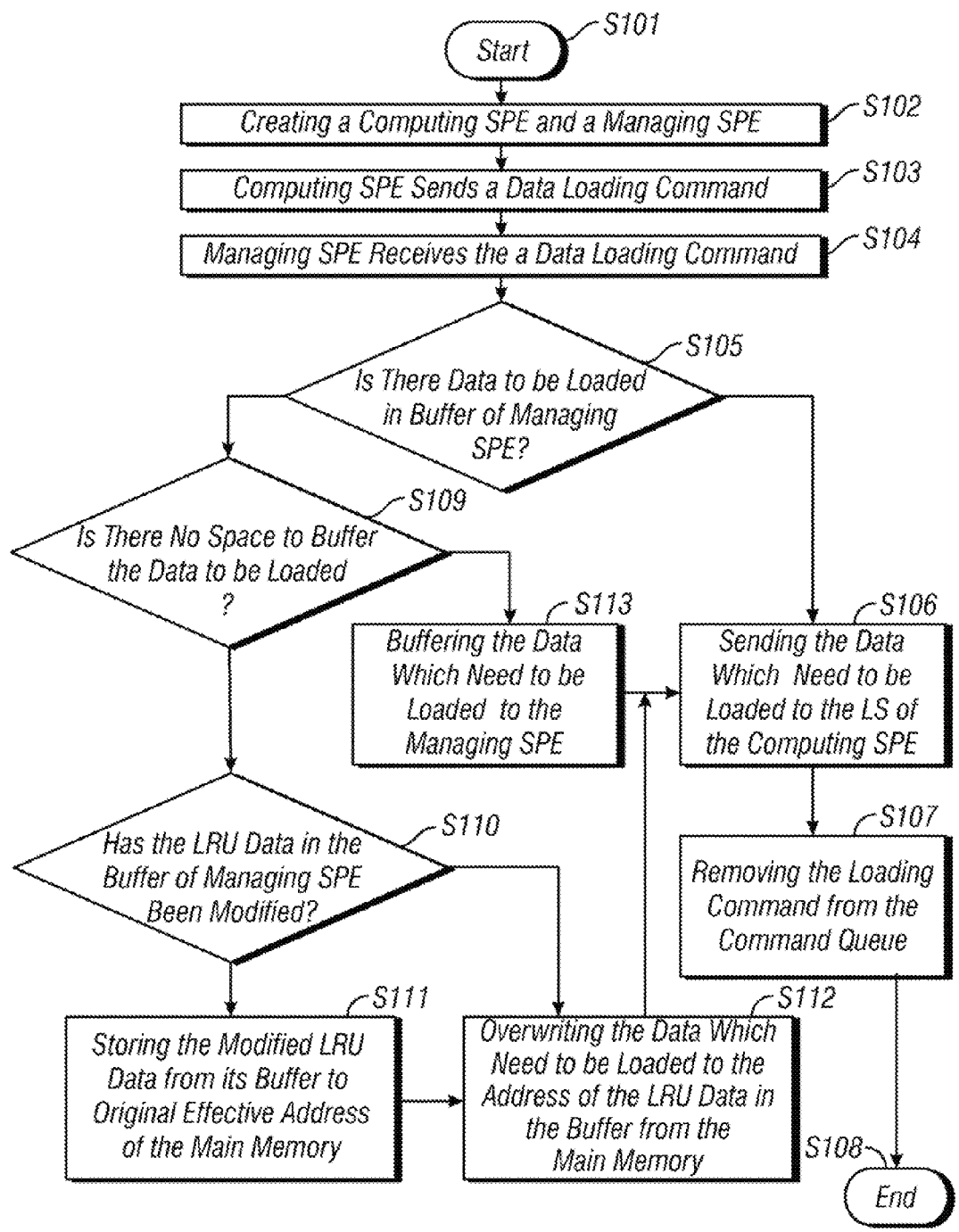
FIG. 1 shows a flowchart of loading data in a method of managing data movement in a CellBE processor according to the inventive subject matter.

FIG. 1 shows a flowchart of loading data in a method of managing data movement in a CellBE processor according to the inventive subject matter. At first, when the CellBE processor runs an application therein, a computing SPE for performing this application is created in a PPE which will be described as FIG. 3 later, and an idle SPE among multiple SPEs is created as a managing SPE for the computing SPE. The managing SPE is used to manage movement of data of the computing SPE (step S102). As described with respect to FIG. 3 later, each SPE has one Runtime, and the managing SPE has a part for storing command queue and a buffer for buffering data. While PPE creates the managing SPE, a starting effective address of LS of the managing SPE and an effective address of command queue are informed to the computing SPE. The computing SPE sends a data loading command to the command queue in the managing SPE during executing the application or in advance. This command instructs the managing SPE to load into the computing SPE the data needed by the computing SPE in time (step S103). The computing SPE can issue this command through DMA, mailbox or other SPE-SPE communication method. The data loading command is a quaternion (SRC, DEST, SIZE, READYBIT_EA) as described below in which the sequence of respective elements may be various. SRC is an effective address of data which need to be loaded, and generally is an effective address of the data in the main memory or an address of LS in the managing SPE during the loading stage. DEST is an effective address of data which need to be stored, and generally is an effective address in the computing SPE during the loading stage. SIZE is size of the data which need to be moved or loaded. READYBIT_EA is an effective address of a ready bit, that is, runtime (Runtime) in the computing SPE will set the data into valid when the data has been transferred from the managing SPE to the computing SPE. The managing SPE confirms reception of the data loading command and prepares to execute the data loading command (step S104).

After the managing SPE confirms existence of the data loading command in the command queue, firstly, it determines whether there is data to be loaded in buffer of its local storage LS according to the loading command described by the quaternion (YES of step S105). If the data to be loaded has been buffered in the buffer, the managing SPE issues DMA (direct memory access) and sends the data that needs to be loaded from the buffer of the managing SPE to destination effective address DEST in the computing SPE (step S106). Then the data loading command is removed from the command queue (step S107) and the loading process ends (step S108).

If the managing SPE determines that no data to be loaded is in the buffer of its local storage LS according to the loading command described by the quaternion (NO of step S105), it needs to judge whether there is no space in its buffer to buffer the data which need to be loaded (step S109). If judgment result at step S109 is "NO", the process goes to step S113 where the managing SPE issues DMA (direct memory access) based on the loading command described by the quaternion so as to buffer the data which need to be loaded from the main memory to the buffer of the managing SPE. Sequentially, the process goes to step S106.

On the other hand, if the managing SPE judges that there is no space in its buffer to buffer the data which need to be loaded at step S109, the process goes to step S110, where the managing SPE uses the principle of Least Recently Use (LRU) to find out least-recently-used data buffered in the buffer and determines whether input entry of the least-recently-used data is modified. Generally, the data is marked as "load" if it is not modified, otherwise is marked as "store". If judgment result at step S110 is "NO", the process goes to step S112 where the managing SPE issues DMA (direct memory access) based on the loading command described by the quaternion so as to directly buffer and overwrite the data which need to be loaded to the address of the least-recently-used data in the buffer of the managing SPE from the main memory. Then the process goes to step S106.

Besides, if the managing SPE determines that the input entry of the least-recently-used data was modified, e.g. the least-recently-used data was marked as "store", then the process goes to step S111 where DMA (direct memory access) is issued. The managing SPE issues DMA (direct memory access) based on the loading command described by the quaternion so as to store the modified least-recently-used data from its buffer to original effective address of the main memory. Then the process goes to step S112.

Figure 2:
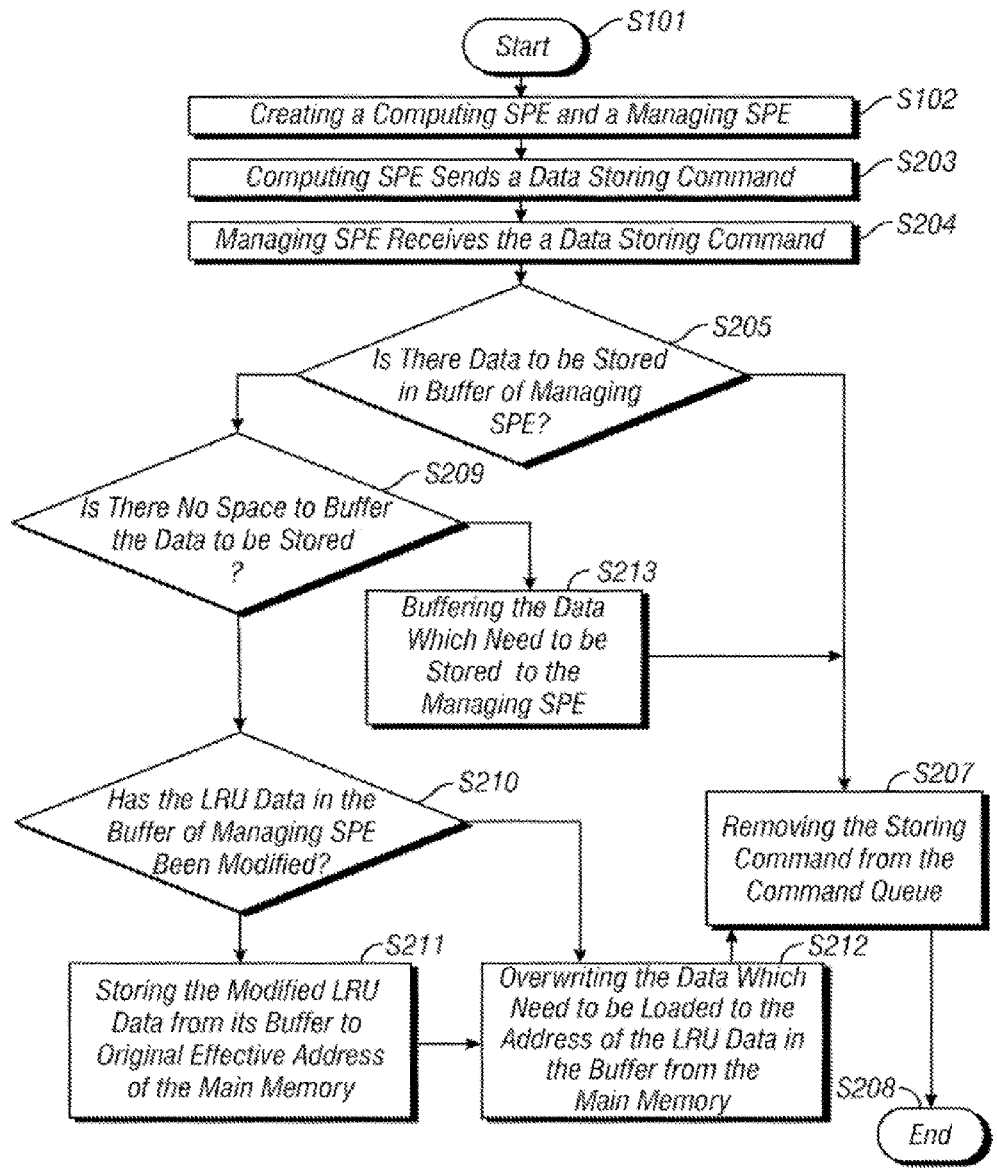
FIG. 2 shows a flowchart of storing data in the method of managing data movement in the Cell BE processor according to the inventive subject matter.

FIG. 2 shows a flowchart of storing data in the method of managing data movement in the CellBE processor according to the inventive subject matter. Like description with reference to FIG. 1, firstly, when the CellBE processor runs an application therein, a computing SPE for performing this application is created in a PPE which will be described as FIG. 3 later, and an idle SPE among multiple SPEs is created as a managing SPE for the computing SPE. The managing SPE is used to manage movement of data of the computing SPE (step S102). The managing SPE has a part for storing command queue and a buffer for buffering data. While PPE creates the managing SPE, the computing SPE has obtained the starting effective address of LS of the managing SPE and the effective address for command queue. The computing SPE sends a data storing command to the command queue in the managing SPE when executing the application and requiring storing the generated data. This command instructs the managing SPE to buffer the data generated by the computing SPE into buffer of the managing SPE and then to the main memory (step S203). The computing SPE can issue this command through DMA, mailbox or other SPE-SPE communication method. The data storing command is also a quaternion (SRC, DEST, SIZE, READYBIT_EA) in which SRC is an effective address of data which need to be stored, and generally is an effective address of the data in the main memory during the storing stage; DEST is an effective address of data which need to be stored, and generally is an effective address in the main memory or the buffer of the managing SPE during the storing stage; SIZE is the size of the data which need to be moved or stored; and READYBIT_EA is an effective address of a ready bit, that is, runtime (Runtime) in the managing 8PE will set the data which has been buffered in the buffer into valid. The managing SPE confirms reception of the data storing command and prepares to execute the data storing command (step S204).

After the managing SPE confirms existence of the data storing command in the command queue, firstly, it determines whether there is data to be stored in buffer of its local storage LS according to the loading command described by the quaternion (YES at step S205). If the data to be stored has been buffered in the buffer, the managing SPE removes the data storing command from the command queue (step S207) and terminates the storing process (step S208). Or the data to be stored may be overwritten to the address of same data in the buffer directly in the case where the data to be stored has been in the buffer.

If the managing SPE determines that no data to be stored is in the buffer of its local storage LS according to the storing command described by the quaternion (NO of step S205), it needs to judge whether there is no space in its buffer to buffer the data which need to be stored (step S209). If judgment result at step S209 is "NO", the process goes to step S213 where the managing SPE issues DMA (direct memory access) based on the storing command described by the quaternion so as to buffer the data which need to be stored from the main memory to the buffer of the managing SPE. Then the process goes to step S207.

On the other hand, if the managing SPE judges that there is no space in its buffer to buffer the data which need to be stored at step S209, the process goes to step S210, where the managing SPE uses the principle of Least Recently Use (LRU) to find out least-recently-used data buffered in the buffer and determines whether input entry of the least-recently-used data was modified. If judgment result at step S110 is "NO", for example, the data is marked as "load", the process goes to step S212 where the managing SPE issues DMA (direct memory access) based on the storing command described by the quaternion so as to directly buffer and overwrite the data which need to be stored to the address of the least-recently-used data in the buffer of the managing SPE from the computing SPE. Then the process goes to step S207.

Besides, if the managing SPE determines that the input entry of the least-recently-used data was modified, e.g. the least-recently-used data was marked as "store", then the process goes to step S211 where DMA (direct memory access) is issued. The managing SPE issues DMA (direct memory access) based on the storing command described by the quaternion so as to store the modified least-recently-used data from its buffer to original effective address of the main memory. Then the process goes to step S212.

Another aspect of the present inventive subject matter provides a cell broadband engine processor for running the above data movement managing method, comprising a Power Processing Element (PPE), multiple Synergistic Processing Elements (SPEs), a Memory Flow Control (MFC), an Internal Interrupt Control (IIC), and a Main Memory, characterized in that when the cell broadband engine processor runs an application, the power processing element is used to create a computing SPE from the multiple SPEs and to create a managing SPE among idle SPEs from the multiple SPEs, and informs the computing SPE among the multiple SPEs that executes the application of a starting effective address of LS associated with the managing SPE and an effective address for a command queue, and the LS in the managing SPE includes a part for storing the command queue and a buffer part for buffering data, and is used to manage movement of the data related to computing of the computing SPE based on the command queue from the computing SPE.

Figure 3:
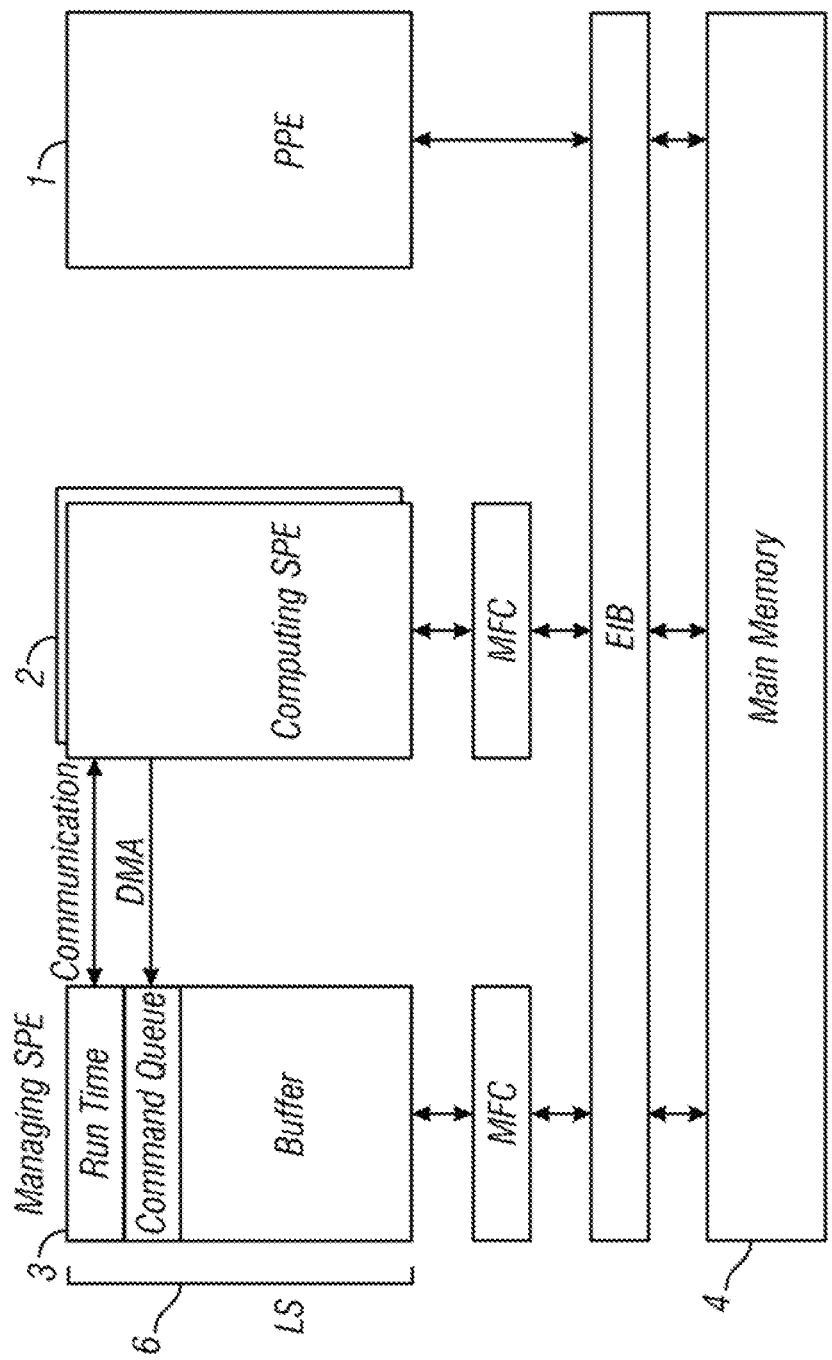
FIG. 3 shows architecture of a managing SPE and a computing SPE in the CellBE processor according to the inventive subject matter.

FIG. 3 shows a schematic diagram of a managing SPE and a computing SPE of the CellBE processor according to the present inventive subject matter. To simplicity, several elements without direct relationships with respect to the present inventive subject matter are omitted. Same elements are indicated by like reference numbers.

As shown in FIG. 3, the cell broadband engine processor according to the present inventive subject matter mainly comprises a Power Processing Element (PPE) 1, a computing Synergistic Processing Element (SPE) 2, a managing Synergistic Processing Element (SPE) 3 and a Main Memory 4. Each synergistic processing element may include a local storage (LS) 5 and a runtime (Runtime) 6 which is used to manage local storage 5 in the synergistic processing element that it belongs to and date access from other synergistic processing elements. The LS of the managing SPE includes a command queue storing part for storing commands sent from the computing SPE and a data buffer for buffering data. The Runtime may pre-fetch data from the main memory 4 and responds for writing the data buffered in the data buffer into the main memory 4 or LS of the computing SPE 2 according to the data loading command in the command queue.

During the cell broadband engine processor executing the application, the managing SPE is an agent for PPE-SPE and SPE-SPE data communication. The managing SPE responds for loading data from the main memory and local storage, for storing data into the main memory and local storage, and for writing the modified data back into the main memory and local storage.

The runtime runs in the managing SPE in response to data loading and storing request from other SPEs. It issues DMA to loading data from the main memory (or the local storage) and put the data into the data buffer, and the runtime will handle the data movement for other SPEs.

The command queue is a communication channel between the computing SPE and the managing SPE. The computing SPE sends its data loading/storing command into the command queue, and the managing SPE retrieves request from the queue.

Referring to FIG. 3, when the cell broadband engine processor executes an application, the PPE creates a SPE thread for managing SPE, and informs the computing SPE of the starting effective address of LS associated with the managing SPE and the effective address for command queue. In order to perform data loading/storing operations, the computing SPE issues request or command to the management data movement SPE (i.e., the managing SPE). The computing SPE can issue this command through DMA, mailbox or other SPE-SPE communication method. The data storing command is a quaternion (SRC, DEST, SIZE, READYBIT_EA) in which SRC is an effective address of data which need to be stored; DEST is an effective address of data which need to be stored; SIZE is the size of the data which need to be moved or stored; and READYBIT_EA is an effective address of a ready bit, and Runtime will set the data into valid when it is prepared. SRC, DEST and READYBIT_EA may be addresses of the main memory or the local storage.

With the present inventive subject matter, available buffer space when the cell broadband engine processor of the inventive subject matter executes the application is significantly larger than existing soft-cache solution, and available space for programs will not be decreased. The inventive subject matter does not conflict with up-and-coming technologies for SPE, and not need extra hardware support. Due to application of the inventive subject matter, data stored in the managing SPE will not be swapped into hard disk swap by the operation system. Also, memory flow control (MFC) of running program in the computing SPE can be used for PPE-SPE communication because data loading and storing works are performed by the managing SPE. With providing the buffer in the managing SPE, more persistent data may be buffered, reducing cost for communication. Further, because of minimal setup time for local memory, the latency and throughput of the computing SPE to PPE data movement will be better.

It should be noted that the present inventive subject matter does not set limitation to amount of SPE for data management, and the embodiments may use all available SPEs or some part of the SPEs. Also, one managing SPE may serve a plurality of SPE. Other buffer management and data pre-fetch techniques are not limited.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for managing data movement as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of managing data movement in a cell broadband engine processor, comprising: determining one or more idle synergistic processing elements (SPEs) among multiple SPEs in the cell broadband engine processor; creating, by a power processing element, a computing SPE from the multiple SPEs for an application; creating, by the power processing element, a managing SPE from a first SPE of the one or more idle SPEs; informing the computing SPE of a starting effective address of a local storage (LS) of said managing SPE and an effective address for a command queue; and managing, by the managing SPE, movement of data associated with computing of said computing SPE based on one or more commands in the command queue sent from the computing SPE to the managing SPE; and wherein the managing SPE comprises a data buffer located in the LS.

2. The method according to claim 1, wherein said managing SPE managing movement of data associated with computing of said computing SPE based on the one or more commands comprises: determining, by the managing SPE, that the one or more commands in said command queue comprises a data loading command; determining that data to be loaded in accordance with the data load command is in said data buffer; issuing a command, by the managing SPE, to transfer said data to be loaded to a destination address of the computing SPE and to remove said loading command from the command queue.

3. The method according to claim 1, wherein the managing SPE managing movement of data associated with computing of said computing SPE based on the one or more commands comprises: determining, by the managing SPE, that the one or more commands in said command queue comprises a data loading command determining that the data to be loaded in accordance with the data load command is not in the buffer; determining whether space of said data buffer can accommodate the data of the data load command based on size of the data ; if the space of said data buffer can accommodate the data of the data load command, buffering the data in said data buffer before said issuing the command to transfer said data of the data load command; if the space of said data buffer cannot accommodate the data of the data load command, determining whether a least recently used data is modified; if the least recently used data is modified, issuing a command, by the managing SPE, to store the least recently used data to memory from the data buffer and overwriting the least recently used data in the data buffer with the data of the data load command before said issuing the command to transfer said data of the data load command; and if the least recently used data is not modified, overwriting the least recently used data in the data buffer with the data of the data load command before said issuing the command to transfer said data of the data load command.

4. The method according to claim 2, wherein the command to transfer said data to be loaded comprises one of a direct memory access command, a SPE to SPE command, and a mailbox command.

5. The method according to claim 1, wherein the managing SPE managing movement of data associated with computing of said computing SPE based on the one or more commands comprises: determining, by said managing SPE, that the one or more commands in said command queue comprises a data storing command; determining that data to be stored in accordance with the data storing command is in said data buffer; and removing said data storing command from the command queue.

6. The method according to claim 1, wherein the managing SPE managing movement of data associated with computing of said computing SPE based on the one or more commands comprises: determining, by said managing SPE, that the one or more commands in said command queue comprises a data storing command; determining that the data to be stored in accordance with the data storing command is not in the buffer; determining whether space of said data buffer can accommodate the data of the data storing command based on size of the data to be stored; if the space of said data buffer can accommodate the data of the data storing command, buffering the data in said data buffer before said removing the data storing command from the command queue; if the space of said data buffer cannot accommodate the data of the data storing command, determining whether a least recently used data in the data buffer is modified; if the least recently used data is modified, issuing a command, by the managing SPE, to store the least recently used data to memory from the data buffer and overwriting the least recently used data in the data buffer with the data of the data storing command before said removing the data storing command from the command queue; and if the least recently used data is not modified, overwriting the least recently used data in the data buffer with the data of the data storing command before said removing the data storing command from the command queue.

7. The method according to claim 6, wherein, said determining whether the least recently used data in the data buffer is modified comprises the managing SPE determining whether the least recently used data is marked for storing.

8. A cell broadband engine processor comprising: a memory; a power processing element (PPE) coupled with the memory, the PPE operable to, create a synergistic processing element (SPE) of a plurality of SPEs as a computing SPE for an application, determine idles ones of the plurality of SPEs, and create a managing SPE from an idle one of the plurality of SPEs, inform the computing SPE of a starting effective address of the local storage of the managing SPE and an effective address for a command queue; the plurality of SPEs, each associated with a local storage, operable to, when created as the managing SPE, manage movement of data associated with computing of the computing SPE based on one or more commands associated with the application from the computing SPE; and, when created as the computing SPE, send the one or more commands to the managing SPE for insertion into the command queue; and wherein the managing SPE comprises a data buffer located in the local storage.

9. The cell broadband engine processor of claim 8 further comprising a memory flow control and an internal interrupt control.

10. The cell broadband engine processor of claim 8, wherein the managing SPE operable to manage movement of data associated with computing of the computing SPE based on the one or more commands comprises the managing SPE being operable to: determine whether data of the one or more commands in said command queue comprises a data loading command or a data storing command; determine whether data to be loaded in accordance with the data load command is in said data buffer; and if the managing SPE determines that the data to be loaded is in the data buffer, issue a command to transfer said data to be loaded to a destination address of the computing SPE; and remove said loading command from the command queue.

11. The cell broadband engine processor of claim 10, wherein if the managing SPE determines that the data to be loaded is not in the data buffer, the managing SPE is operable to:
  determine whether space of said data buffer can accommodate the data of the data load command based on size of the data;
  if the space of said data buffer can accommodate the data of the data load command, buffer the data in said data buffer before issuing the command to transfer said data of the data load command to the destination address of the computing SPE;
  if the space of said data buffer cannot accommodate the data of the data load command, determine whether a least recently used data in the data buffer is modified;
  if the least recently used data is modified, issue a command to store the least recently used data to memory from the buffer and overwrite the least recently used data in the buffer with the data of the data load command before the managing SPE issues the command to transfer said data of the data load command to the destination address of the computing SPE; and
  if the least recently used data is not modified, overwrite the least recently used data in the data buffer with the data of the data load command before the managing SPE issues the command to transfer said data of the data load command to the destination address of the computing SPE.

12. The cell broadband engine processor of claim 11, wherein the command to transfer said data to be loaded comprises one of a direct memory access command, a SPE to SPE command, and a mailbox command.

13. The cell broadband engine processor of claim 8, wherein the managing SPE operable to manage movement of data associated with computing of the computing SPE based on the one or more commands comprises the managing SPE being operable to: determine that the one or more commands in said command queue comprises a data storing command; determine whether the data to be stored in accordance with the data storing command is in said data buffer; and if the managing SPE determines that the data to be stored in accordance with the data storing command is in said data buffer, remove the data storing command from the command queue.

14. The cell broadband engine processor of claim 13, wherein if the managing SPE determines that the data to be stored is not in the data buffer, the managing SPE is operable to:
   determine whether space of said data buffer can accommodate the data of the data storing command based on size of the data to be stored;
   if the space of said data buffer can accommodate the data of the data storing command, buffer the data in said data buffer before the managing SPE removes the data storing command from the command queue;
   if the space of said data buffer cannot accommodate the data of the data storing command, determine whether a least recently used data in the data buffer is modified;
   if the least recently used data is modified, issue a command to store the least recently used data to memory from the data buffer and overwrite the least recently used data in the data buffer with the data of the data storing command before the managing SPE removes the data storing command from the command queue; and
   if the least recently used data is not modified, overwriting the least recently used data in the data buffer with the data of the data storing command before the managing SPE removes the data storing command from the command queue.

15. The cell broadband engine processor of claim 14, wherein, the managing SPE being operable to determine whether the least recently used data in the data buffer is modified comprises the managing SPE operable to determine whether the least recently used data is marked for storing.

* * * * *